Patented May 13, 1969

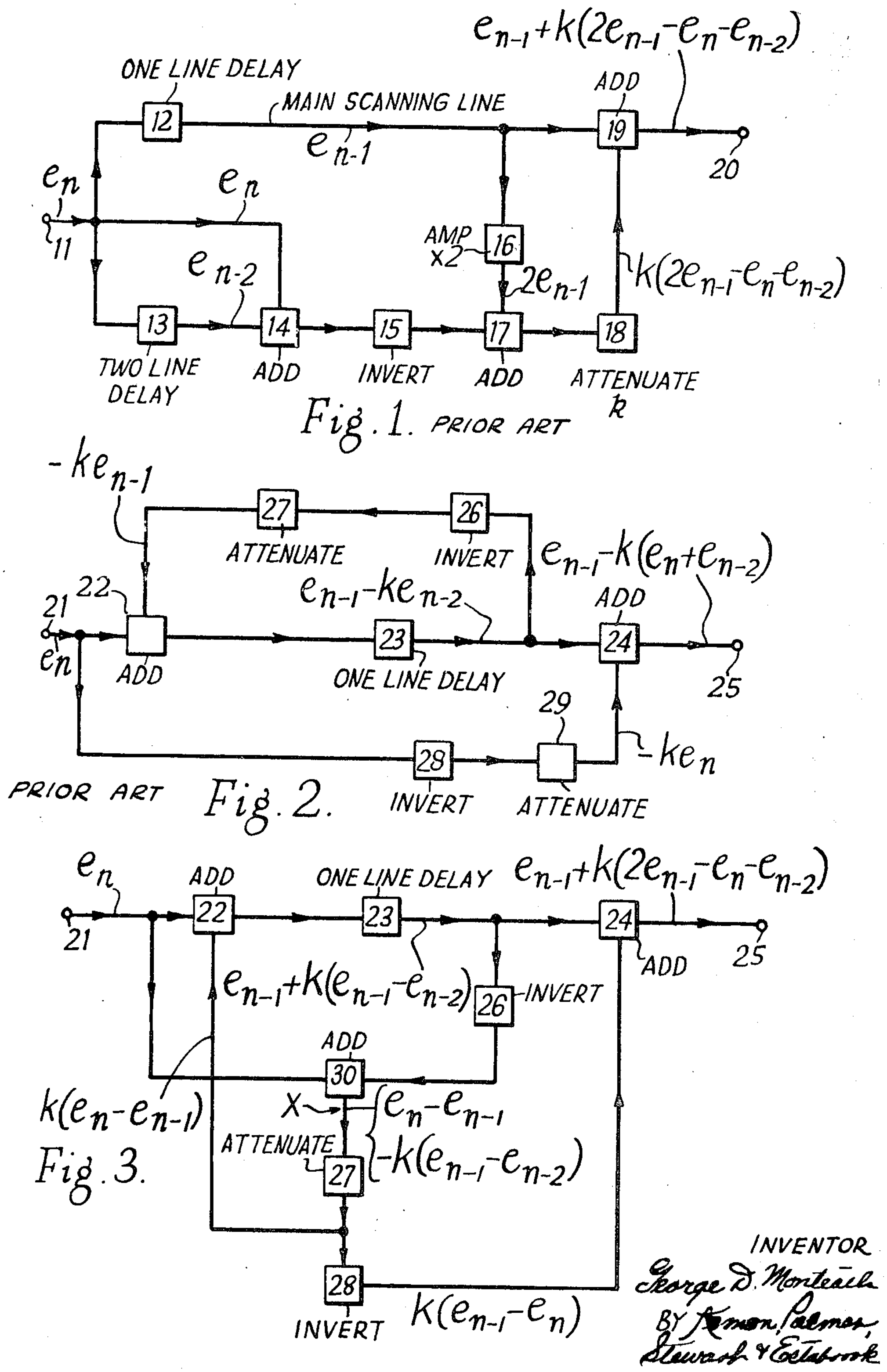
Fig. 1. PRIOR ART, PRIOR ART Fig. 2., Fig. 3.
INVENTOR
George D. Monteath
BY Kemon, Palmer, Stewart & Estabrook
ATTORNEYS INVENTOR
George D. Monteath
BY Kemon, Palmer, Stewart & Estabrook
ATTORNEYS United States Patent Office 3,444,318

3,444,318

APPARATUS FOR PROCESSING TELEVISION SIGNALS

George Dewar Monteath, Tadworth, England, assignor to The Marconi Company Limited and Standard Telephones & Cables Limited, London, England Filed Apr. 20, 1966, Ser. No. 543,868
Claims priority, application Great Britain, May 3, 1965, 18,576/65
Int. Cl. H04n 5/38
U.S. Cl. 178—7.2 5 Claims

ABSTRACT OF THE DISCLOSURE

Apparatus is disclosed for effecting vertical aperture correction in television signals using a single delay device and a number of signal combining devices which combine the signals in such a manner as to produce at one point a correcting signal which is zero in plain areas of a picture. The degree of correction can be controlled by means of a signal attenuator located at the said point.

The present invention relates to apparatus for processing television signals, and has particular application in apparatus for providing vertical aperture correction in television signals.

Aperture correction of television signals consists of the correction (in practice only the partial correction) of the distortion produced by the finite size and non-uniform flux distribution of the scanning spot both in the camera and on the display screen. The nature of the television scanning process in horizontal lines necessitates entirely different approaches to the problems of applying aperture correction in the horizontal and vertical directions. The use of horizontal aperture correction is well known and this correction is applied in most television systems. The application of vertical aperture correction has become practical in recent years as a result of the development of wide-band ultrasonic delay devices. In this specification, the uses of the invention in the field of aperture correction are described with reference to vertical aperture correction, and not to horizontal aperture correction.

A practical method of vertical aperture correction was first proposed by W. G. Gibson and A. C. Schroeder, and is described by them in a paper entitled, "A Vertical Aperture Equalizer for Television," in the Journal of the S.M.P.T.E., vol. 69, No. 6, pages 359–401, June 1960. An example of this known type of vertical aperture corrector is described in detail hereinafter with reference to FIG. 1 of the accompanying drawings. The method of operation involves the combination of information derived from three successive scanning lines in the same television field, and known circuits for carrying out this method of correction have involved the use of two delay devices.

It is one object of the present invention to provide a vertical aperture corrector in which it is only necessary to use one delay device.

According to the present invention apparatus for processing an input television signal comprises a delay device for delaying the input signal by one or more line periods, and a correction circuit the effect of which is to subtract from the signal entering the delay device a proportion of the signal leaving the delay device, and to subtract from the signal leaving the delay device a proportion of the said input signal.

In a preferred embodiment, the correction circuit comprises a circuit for obtaining the difference of two signals consisting of or including the input signal and the signal leaving the delay device respectively, an attenuator for attenuating the difference signal, and a circuit for adding to the signal entering the delay device the attenuated difference signal or the inverse of that signal, and for adding to the signal leaving the delay device the inverse of the said signal added to the input to the delay device. If the difference signal is obtained by subtracting the input signal leaving the delay device, then the signal added to the input to the delay device must be the inverse of the attenuated difference signal. If on the other hand the difference signal is obtained by subtracting the signal leaving the delay device from the input signal, then the signal added to the input to the delay device must be the attenuated difference signal. These conditions are necessary in this preferred embodiment to fulfill the requirements of the correction circuit specified in the preceding paragraph.

Embodiments of the invention in the field of vertical aperture correction will now be described by way of example with reference to the accompanying drawing, in which:

FIG. 1 is a block circuit diagram of a previously known vertical aperture corrector.

FIG. 2 is a block circuit diagram showing another known and simple vertical aperture corrector.

FIG. 3 is a block diagram of one embodiment of the present invention, and

Figure 4:
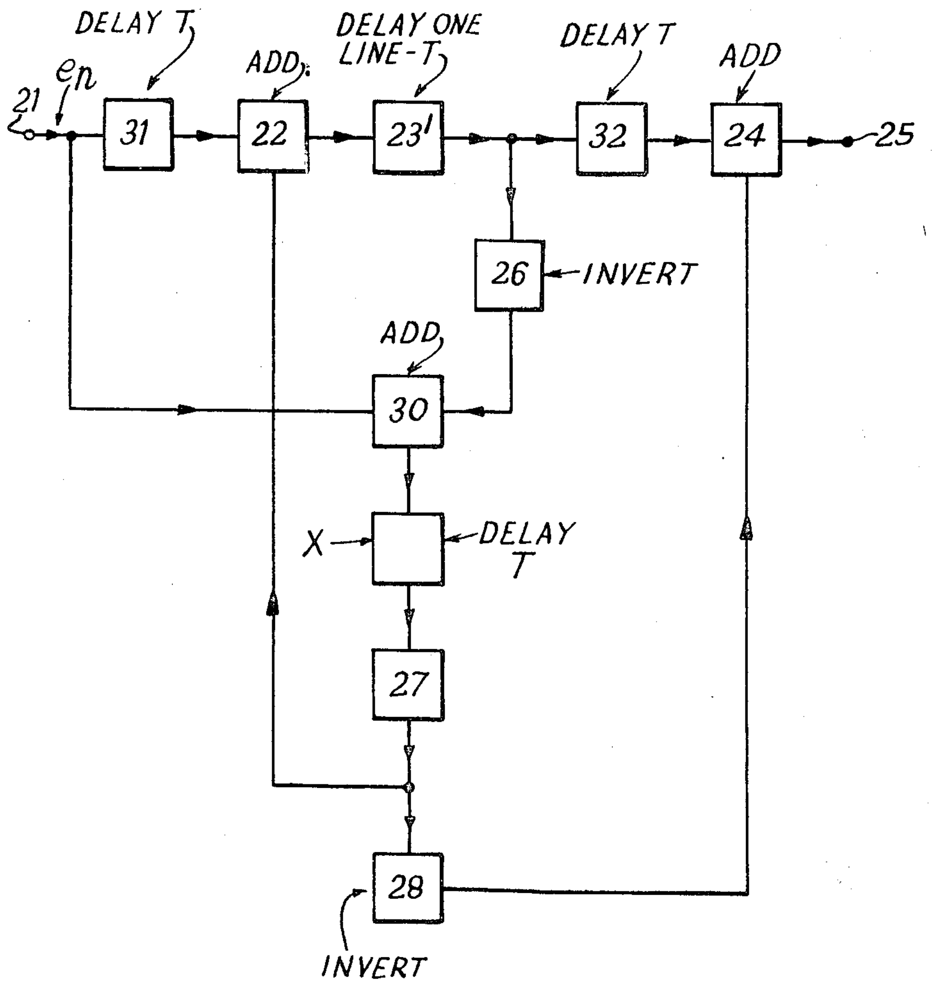
FIG. 4 shows a modification of the embodiment of FIG. 3.

In FIG. 1 is shown a known type of vertical aperture corrector such as is described by W. G. Gibson and A. C. Schroeder at pages 398 to 399 of the publication referred to hereinbefore. The vertical aperture correction is achieved by subtracting from each line of an input television signal a proportion of the immediately preceding line and of immediately following line. (When discussing, by way of example, the procecessing of a particular line, that line will be referred to as the main scanning line.)

The circuit of FIG. 1 also provides for the addition to the final output signal of a proportion (equal to twice the aforesaid proportion) of the main scanning line. The reason for this addition is that, in the case where there is no change of brightness along a vertical line of a television field, it is desirable that the overall brightness of such a vertical line shall not be reduced by the subtraction from each scanning line of a proportion of its neighboring lines. To maintain the overall brightness of such a vertical line a component of each main scanning line is added to the correcting signal of the vertical aperture corrector. The exact effect of the different components of the correcting signal will become apparent in connection with the following description of the known circuit shown in FIG. 1.

Three successive lines, $e_{n-2}$, $e_{n-1}$, and $e_n$, of an input television signal are fed to an input terminal 11. At the time shown in FIG. 1, the beginning of the line $e_n$ is being fed to the input terminal 11. The line $e_n$ is fed to a delay device 12 which delays signals fed to it by one line period. The signal leaving the delay device 12 corresponds to the line $e_{n-1}$ which is regarded as the main scanning line in this example.

The line $e_n$ is also fed from the input terminal 11 to a second delay device 13 which delays signals fed to it by two input line periods. The delay device 13 feeds the line $e_{n-2}$ to an adder 14 where this line is added to the line $e_n$. The combined signal is then inverted in an inverter 15 to provide a signal of opposite polarity to the combined signal $e_n+e_{n-2}$.

The main scanning line is fed to an amplifier 16 which doubles the amplitude of the signal and feeds the resultant signal ($2e_{n-1}$) to an adder 17 where it is added to the inverted, combined signal from the inverter 14. The resultant signal can be expressed mathematically as $$2e_{n-1}-e_n-e_{n-2}$$

This signal is attenuated by an attenuation factor $k$ in an attenuator 18 to give a correction signal which can be expressed as $$k(2e_{n-1}-e_n-e_{n-2})$$

The correction signal is added to the main scanning line $e_{n-1}$ in an adder 19 which feeds to an output terminal 20 a final, corrected, output signal which can be expressed as $$e_{n-1}+k(2e_{n-1}-e_n-e_{n-2})$$

It will be apparent that for the case of a vertical line of constant brightness (or for a whole picture of constant brightness) the terms $e_n$, $e_{n-1}$ and $e_{n-2}$ will have the same values, with the result that the corrected output signal can be expressed as $e_{n-1}$, and is unaffected by the correction.

In previously known vertical aperture correctors such as that shown in FIG. 1, it has been necessary to include two delay devices to provide the necessary components of the correction signal. One of the advantages of a vertical aperture corrector embodying the invention is that it is only necessary to include one delay device.

In the circuit of FIG. 2, a series of lines $e_{n-2}$, $e_{n-1}$ and $e_n$ and so on are fed to an input terminal 21. At the time shown in FIG. 2 the beginning of the line $e_n$ is being fed to the terminal 21. The line $e_n$ is fed through an adder 22 to a delay device 23 having a delay value of one line period. The main portion of the signal leaving the delay device 23 consists of the line $e_{n-1}$ which is regarded as the main scanning line and is fed through a further adder 24 to an output terminal 25.

The output signal from the delay device 23 is also fed through an inverter 26 and an attenuator 27 (having an attenuation factor $k$) to the adder 22 where the attenuated signal is added to the input signal consisting of the line $e_n$. It is apparent that part of the signal fed from the delay device 23 to the inverter 26 will continue to recirculate through the feedback circuit, becoming weaker each time it passes through the attenuator 27. This recirculation introduces unwanted components of lines $e_{n-3}$, $e_{n-4}$, $e_{n-5}$ and so on, and produces in the final television picture effects known as "ringing" on the lower edges of diagonal and horizontal transitions in the picture. This ringing will depend on the magnitude of the attenuation factor $k$ and will therefore increase as the amount of vertical aperture correction applied increases.

In the following descriptions of FIGS. 2 and 3, it will be assumed that any signal passing through an attenuator more than once is of negligible magnitude. The signal leaving the attenuator 27 can therefore be represented as $-ke_{n-1}$, and the signal leaving the delay device 23 by $$e_{n-1}-ke_{n-2}$$

The input signal consisting of the line $e_n$ is also fed through a further inverter 28 to an attenuator 29 (also having an attenuation factor equal to $k$). The output signal from the attenuator 29 can be represented by $-ke_n$, and is fed to the adder 24 where it is added to the output signal from the delay device 23, to provide a final, corrected output signal represented by $$e_{n-1}-k(e_n+e_{n-2})$$

The side circuits including the elements 26, 27 and 22, and 28, 29 and 24 constitute a correction circuit in this embodiment.

In the arrangement shown in FIG. 2, it will be seen that no component of the main scanning line $e_{n-1}$ forms part of the correction signal. Thus, if there is no vertical information in the picture, the amplitude of the correction signal is not zero and the mean brightness of the corrected picture varies with the amount of vertical aperture correction applied. This disadvantage is overcome by the circuit shown in FIG. 3, in which certain circuit elements operate in a manner corresponding to FIG. 2 and are therefore designated by the same reference numerals as in that figure. The only additional circuit element is an adder 30. The elements are arranged in a different circuit from that shown in FIG. 2, and the manner of operation of the circuit is as follows.

The line $e_n$ is fed from the input terminal 21 through the adder 22 to the delay device 23. The signal leaving the delay device 23 (consisting mainly of the main scanning line $e_{n-1}$) is fed through the adder 24 to the output terminal 25, so far the circuit is the same as that shown in FIG. 2.

The adder 30 and the inverter 26 form the difference of the input signal and the signal leaving the delay device 23 and feed this difference signal to the attenuator 27. The attenuated signal is added to the line $e_n$ in the adder 22, and is also inverted in the inverter 28 and added in the adder 24 to the signal leaving the delay device 23.

Assuming again that any signals which pass through the attenuator more than once are of negligible magnitude, the signals occurring at various parts of the circuit can be represented as shown in FIG. 3. In particular, the signal leaving the delay device 23 can be represented as $$e_{n-1}+k(e_{n-1}-e_{n-2})$$

and the part of the correcting signal added to this signal in the adder 24 can be represented as $$k(e_{n-1}-e_n)$$

The final output signal at the terminal 25 can be represented as the sum of these two signals, that is to say $$e_{n-1}+k)2e_{n-1}-e_n-e_{n-2})$$

This circuit has precisely the same effect as the circuit of FIG. 2 when both circuits are correctly adjusted, but is much easier to adjust, since variation of the attenuator, which determines the degree of correction, has no effect on the mean brightness of the picture.

A further advantage of the circuit of FIG. 3 is that a network can be inserted at the point marked X so as to modify the correction applied, without in any way modifying the picture where there is no vertical detail. Thus it is sometimes advantageous to insert a low-pass filter or band-stop filter at X so as to avoid modifying the chrominance signal when applying the corrector to colour signals. Alternatively a non-linear network arranged to suppress weak signals could be placed at X to avoid noise in plain areas being accentuated by the correction. Such an arrangement is analogous to "crispening" which is a known method of processing television signals to improve the horizontal detail.

Instead of the line $e_n$ being fed from the input terminal 21 to the adder 30, the input signal to the adder 30 can be taken from a point between the adder 22 and the delay device 23 or 23'. Further, instead of taking the input signal to the inverter 26 from a point between the delay device 23 or 23' and the adder 24, the signal can be taken from a point between the adder 24 and the output terminal 25. These changes merely provide alternative circuits and do not introduce any material changes in the manner of operation of the circuit.

One disadvantage of the arrangement of FIG. 3 is that if a filter is used, as above mentioned, for example to reduce noise or to avoid interfering with the chrominance signal in colour television, it is not possible to correct for the delay introduced by such a filter.

The difficulty can be overcome by means of the slightly modified form of FIG. 3 shown in FIG. 4. Like parts in the two figures have the same references.

In FIG. 4 there is shown at X a device, such as a low-pass filter, which introduces a time delay T which is small compared with a line period. In order to compensate for this delay, the delay of the main delay device 23' is made slightly less, namely equal to one line period minus T. Additional delays 31 and 32 each introducing a delay T are arranged as shown on the input and output side of the main delay device 23'. The delay of the main signal at 25 is now one line period plus T. All the components of the correcting signal are now correctly timed with respect to the main signal.

It will be appreciated that many alternative circuits can be constructed which embody the present invention. For example, the circuit of FIG. 3 or FIG. 4 can be modified by arranging for the input signals to the adder 30 to be taken from slightly different points along the main circuit leading from the input terminal 21 to the output terminal 25.

I claim:

1. Apparatus for processing an input television signal to provide vertical aperture correction, said apparatus comprising:

a main input terminal to which an input television signal to be processed is applied;

a main output terminal;

a first signal-combining device;

a delay device;

a second signal-combining device;

said delay device introducing a delay of substantially *n* line periods, where *n* is a smaller integer, and each said combining device having two input terminals and an output terminal and feeding to its output terminal a signal which is a combination of signals fed to its two input terminals;

means coupling said main input terminal to a first input terminal of said first combining device;

means coupling the output terminal of said first combining device through said delay device to a first input terminal of said second combining device;

means coupling the output terminal of said second combining device to said main output terminal;

a third combining device having two input terminals and an output terminal;

means coupling the two input terminals of said third combining device to opposite sides of said delay device, said third combining device producing at its output terminal a difference signal representing the difference between the signals on the two sides of said delay device and said difference signal remaining substantially constant in plain areas of the picture represented by said television signals;

and means coupling the output terminal of said third combining device to the second input terminals of said first and second combining devices.

2. Apparatus according to claim 1, wherein the last-named coupling means includes a single variable attenuator for controlling the inputs to the second input terminals of said first and second combining devices.

3. Apparatus according to claim 1, wherein the last-named coupling means include a portion common to said couplings to said second input terminals of said first and second combining devices, a signal-modifying means being included in said portion.

4. Apparatus according to claim 3, wherein said signal-modifying means is a variable attenuator.

5. Apparatus according to claim 3, wherein said signal-modifying means comprises a low-pass filter.

References Cited

UNITED STATES PATENTS

| | | | |
|---|---|---|---|
| 2,921,128 | 1/1960 | Gibson et al. | 178—7.2 |
| 2,939,910 | 6/1960 | Blake | 178—7.2 |
| 2,971,053 | 2/1961 | Gibson | 178—7.2 |

ROBERT L. GRIFFIN, *Primary Examiner.*

ALFRED H. EDDLEMAN, *Assistant Examiner.*